United States Patent
Jeong et al.

(10) Patent No.: US 8,854,496 B2
(45) Date of Patent: Oct. 7, 2014

(54) IMAGE PICKUP DEVICE AND METHOD OF PICKING UP IMAGE USING THE SAME

(71) Applicant: Samsung Electronics Co., Ltd, Suwon-si (KR)

(72) Inventors: Soo-man Jeong, Suwon-si (KR); Dae-gyu Kang, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/034,993

(22) Filed: Sep. 24, 2013

(65) Prior Publication Data

US 2014/0022404 A1    Jan. 23, 2014

Related U.S. Application Data

(63) Continuation of application No. 13/272,353, filed on Oct. 13, 2011, now Pat. No. 8,570,397.

(30) Foreign Application Priority Data

Dec. 13, 2010 (KR) .................. 10-2010-0127043

(51) Int. Cl.
| | |
|---|---|
| *H04N 5/76* | (2006.01) |
| *H04N 5/232* | (2006.01) |
| *H04N 9/82* | (2006.01) |
| *G10L 15/22* | (2006.01) |
| *H04N 5/77* | (2006.01) |
| *H04N 5/225* | (2006.01) |

(52) U.S. Cl.
CPC ......... *H04N 5/23203* (2013.01); *H04N 9/8205* (2013.01); *H04N 9/8211* (2013.01); *H04N 5/232* (2013.01); *G10L 15/22* (2013.01); *H04N 5/23293* (2013.01); *H04N 5/772* (2013.01); *H04N 5/2258* (2013.01)
USPC .................. 348/231.1; 348/231.2; 348/231.3; 348/231.4

(58) Field of Classification Search
USPC ............ 348/231.1–231.4, 584; 396/283, 312, 396/105
See application file for complete search history.

(56) References Cited

U.S. PATENT DOCUMENTS

2010/0179874 A1 * 7/2010 Higgins et al. ............. 705/14.53
2011/0053642 A1 * 3/2011 Lee ........................... 455/556.1

* cited by examiner

*Primary Examiner* — Yogesh Aggarwal
(74) *Attorney, Agent, or Firm* — Stanzione & Kim, LLP

(57) ABSTRACT

An image pickup device includes an image processing unit which processes an image input through the plurality of image pickup units, a plurality of microphones which are spaced apart from each other, an audio processing unit which senses a voice of a photographer using the plurality of microphones, and a control unit which, when the voice of a photographer is sensed through the audio processing unit, controls the image processing unit to combine an image of an image pickup unit corresponding to a location of the photographer with an image of an image pickup unit currently performing photographing.

20 Claims, 10 Drawing Sheets

MAIN LENS

MAIN MIC CHANNEL ON

SUB LENS

SUB MIC CHANNEL ON

MAIN LENS + SUB LENS PIP

MAIN MIC CHANNEL ON

SUB LENS + MAIN LENS PIP

SUB MIC CHANNEL ON

MAIN MIC CHANNEL ON

MAIN MIC CHANNEL ON

IMAGE PICKUP DEVICE AND METHOD OF PICKING UP IMAGE USING THE SAME

CROSS-REFERENCE TO RELATED APPLICATIONS

This application is a Continuation Application of prior application Ser. No. 13/272,353, filed on Oct. 13, 2011 in the United States Patent and Trademark Office, which claims priority under 35 U.S.C. §119(a) from Korean Patent Application No. 10-2010-0127043, filed on Dec. 13, 2010, in the Korean Intellectual Property Office, the disclosure of which is incorporated herein by reference in its entirety.

BACKGROUND OF THE INVENTION

1. Field of the Invention

The present general inventive concept relates to an image pickup device and a method of picking up an image using the same, and more particularly, to an image pickup device which performs photographing using a plurality of image pickup units once a voice of a photographer is sensed and a method of picking up an image using the same.

2. Description of the Related Art

Generally, an image pickup device, or an image capture device, refers to a device which transforms a light into electricity, and examples of such an image pickup device include digital cameras, including digital cameras of handheld electronic media devices and phones, camcorders, and personal computing devices, such as laptops and tablet computers.

Recently, image pickup devices have been developed to include two lenses to support photographing of both a photographer and a person to be photographed in one screen while photographing a video.

However, even if a dual lens is used to photograph both a photographer and a person to be photographed in one screen, a conventional image pickup device uses only one stereo microphone to receive an audio signal and thus, records the same audio signal as an image pickup device with only one lens.

SUMMARY OF THE INVENTION

A present general inventive concept provides an image pickup device which performs photographing using a plurality of image pickup units once a voice of a photographer is sensed and a method of picking up an image using the same.

Additional features of the present general inventive concept will be set forth in part in the description which follows and, in part, will be obvious from the description, or may be learned by practice of the general inventive concept.

Features of the present general inventive concept may be realized by an image pickup device including an image processing unit which processes an image input through the plurality of image pickup units, a plurality of microphones which are spaced apart from each other, an audio processing unit which senses a voice of a photographer using the plurality of microphones, and a control unit which, when the voice of the photographer is sensed through the audio processing unit, controls the image processing unit to combine an image of an image pickup unit corresponding to a location of a photographer with an image of an image pickup unit currently performing photographing.

The audio processing unit may sense the voice of a photographer using phase difference of the voice sensed through the plurality of microphones.

The audio processing unit may compare the voice input from a microphone corresponding to an image pickup unit currently performing photographing with the voice input from another microphone, and may remove noise from the voice input from a microphone corresponding to the image pickup unit currently performing photographing.

The audio processing unit may convert the voice input from the plurality of microphones into a text, and the image processing unit may add the converted text to the combined image as a subtitle.

The image processing unit may combine an image of an image pickup unit corresponding to a location of the photographer with an image of an image pickup unit currently performing photographing in a form of a Picture-In-Picture (PIP) image.

The device may further include a multiplexer which combines an image synthesized in the image processing unit with the voice input from at least one microphone from among the plurality of microphones and a storage unit which stores the combined image and voice.

The plurality of image pickup units may include a first image pickup unit and a second image pickup unit, and the plurality of microphones may include a first microphone corresponding to the first image pickup unit and a second microphone corresponding to the second image pickup unit, the audio processing unit may determine that a voice of a photographer is sensed if the second microphone senses the voice before the first microphone, and the control unit may control the image processing unit to combine an image photographed through the second image pickup unit with an image photographed through the first image pickup unit.

The image processing unit may combine an image photographed from the second image pickup unit on an image photographed from the first image pickup unit in a form of a PIP image.

The device may further include a manipulation unit which receives a command to change a form of synthesis in the image processing unit, and the image processing unit may change an order of disposing an image of the first image pickup unit and an image of the second image pickup unit according to the command.

The device may further include a multiplexer which, if an image photographed from the first image pickup unit is a main image, combines a voice from the first microphone with an image synthesized in the image processing unit, and if an image photographed from the second image pickup unit is a main image, combines a voice from the second microphone with an image synthesized in the image processing unit and a storage unit which stores the combined image and voice.

Features of the present general inventive concept may also be realized by an image pickup method including performing photographing using at least one image pickup unit from among the plurality of image pickup units, sensing voice of a photographer through a plurality of microphones which are spaced apart from each other, and when the voice of a photographer is sensed, combining an image of an image pickup unit corresponding to a location of a photographer with an image of an image pickup unit currently performing photographing.

The sensing the voice of the photographer may include sensing the voice of the photographer using phase difference of the voice sensed through the plurality of microphones.

The method may further include comparing the voice input from a microphone corresponding to an image pickup unit currently performing photographing with the voice input from another microphone, and removing noise from the voice input from a microphone corresponding to the image pickup unit currently performing photographing.

The method may further include converting the voice input from the plurality of microphones into a text and adding the converted text to the combined image as a subtitle.

The combining may include combining an image of an image pickup unit corresponding to a location of the photographer with an image of an image pickup unit currently performing photographing in a form of a PIP image.

The method may further include combining an image synthesized in the image processing unit with the voice input from at least one microphone from among the plurality of microphones and storing the combined image and voice.

The plurality of image pickup units may include a first image pickup unit and a second image pickup unit, the plurality of microphones may include a first microphone corresponding to the first image pickup unit and a second microphone corresponding to the second image pickup unit, the sensing may include determining that the voice of a photographer is sensed if the second microphone senses the voice before the first microphone, and the combining may include combining an image photographed through the second image pickup unit with an image photographed through the first image pickup unit.

The combining may include combining an image photographed from the second image pickup unit on an image photographed from the first image pickup unit in a form of a PIP image.

The method may further include receiving a command to change a form of synthesis, and the combining may include changing an order of disposing an image of the first image pickup unit and an image of the second image pickup unit according to the command.

The method may further include, if an image photographed from the first image pickup unit is a main image, combining the voice from the first microphone with an image synthesized in the image processing unit, and if an image photographed from the second image pickup unit is a main image, combining the voice from the second microphone with an image synthesized in the image processing unit, and storing the combined image and voice.

Features of the present general inventive concept may also be realized by an image pickup device including first and second image pickup units to record images in first and second directions, respectively, first and second microphones, the second microphone located closer to an end of the image pickup device opposite the first image pickup unit than the second microphone, and a control unit to activate the first image pickup unit, to detect a voice corresponding to the second microphone, and to activate the second image pickup unit when the voice corresponding to the second microphone is detected.

The image pickup device may further include a display unit, wherein the control unit controls the display unit to display a first image corresponding to the first image pickup unit and to display a second image corresponding to the second image pickup unit simultaneously with the first image when the voice corresponding to the second microphone is detected.

The control unit may control the display device to display the second image inside the first image as a picture-in-picture.

The control unit may determine whether a predetermined period of time has passed and may control the control unit to stop displaying the second image when the predetermined period of time has passed.

The control unit may determine whether a voice-to-text mode is activated, and, when it is determined that the voice-to-text mode is activated, the control unit may convert at least one of a first detected voice corresponding to the first microphone and the second detected voice corresponding to the second microphone to text and controls the display unit to display the text.

The display unit may display text corresponding to the first microphone on the first image, and may display text corresponding to the second microphone on the second image.

The control unit may process an audio output signal to cancel the voice corresponding to the second microphone.

While the voice corresponding to the second microphone is detected, the control unit may process an audio output signal to cancel a voice corresponding to the first microphone.

The image pickup device may include a storage unit to store images corresponding to the activated first and second image pickup units and to store corresponding audio from the first and second microphones.

Features of the present general inventive concept may also be realized by a method of controlling an image pickup device including first and second image pickup units facing first and second directions, respectively, and further including first and second microphones, the second microphone located closer to an end of the image pickup device opposite the first image pickup unit than the second microphone, the method including activating the first image pickup unit to capture a first image, detecting a voice corresponding to the second microphone, and when the voice is detected, activating the second image pickup unit to capture a second image.

The method may further include simultaneously displaying the first and second images.

Displaying the first and second images may include displaying the second image as a sub-image within the first image as a picture-in-picture (PIP).

The method may further include determining whether a predetermined period of time has passed, and stopping the displaying of the second image when the predetermined period of time has passed.

The method may further include converting at least one of a first voice corresponding to the first microphone and the second voice corresponding to the second microphone to text, and displaying the text.

The text corresponding to the first microphone may be displayed on the first image and the text corresponding to the second microphone may be displayed on the second image.

The method may further include canceling a voice corresponding to the first microphone when the voice corresponding to the second microphone is detected.

The method may further include canceling the voice corresponding to the second microphone.

Detecting the voice corresponding to the second microphone may include determining that the voice corresponds to the second microphone by detecting that the voice is received by the second microphone prior to being received by the first microphone.

Features of the present general inventive concept may also be realized by a method of controlling an image pickup device including first and second image pickup units facing first and second directions, respectively, and further including first and second microphones, the second microphone located closer to an end of the image pickup device opposite the first image pickup unit than the second microphone, the method including receiving a selection to set the first image pickup unit as a main image pickup unit to generate a main image and the second image pickup unit to generate a sub-image, activating the first image pickup unit, detecting a voice corresponding to the second microphone, and when the voice is detected, activating the second image pickup unit to capture a second image.

The method may further include displaying the second image as a sub-image within the first image.

The first image pickup unit may face in front of the image pickup device and the second image pickup unit may face to the rear of the image pickup device. Alternatively, the second image pickup unit may face in front of the image pickup device and the first image pickup unit may face to the rear of the image pickup device.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
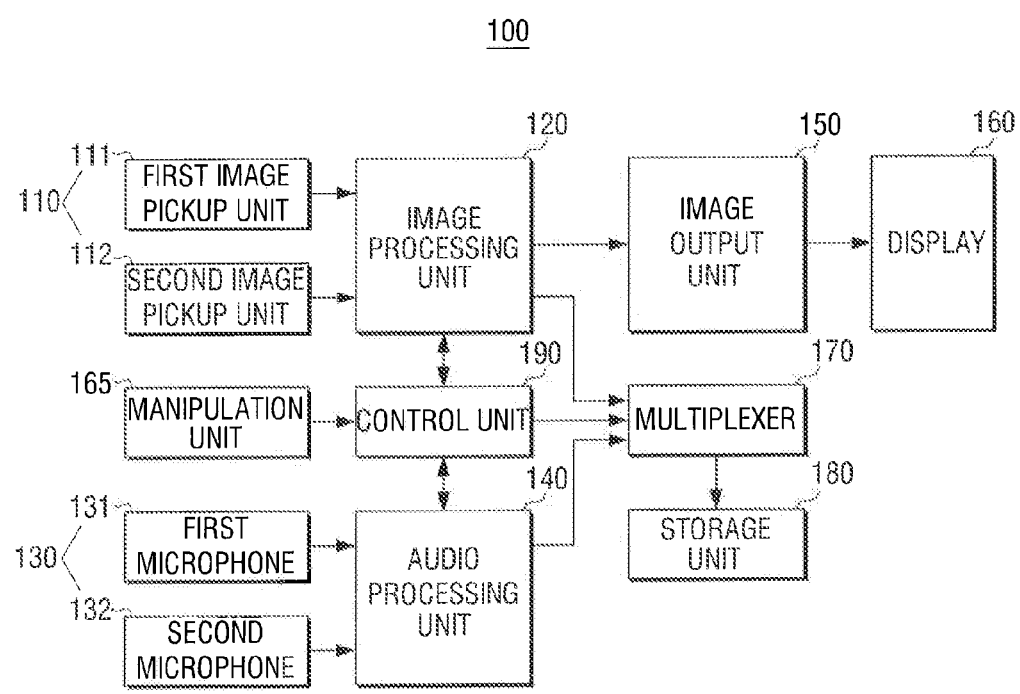
FIG. 1 is a block diagram illustrating configuration of an image pickup device according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating configuration of an image pickup device according to an exemplary embodiment.

Referring to FIG. 1, the image pickup device 100 comprises a plurality of image pickup units 110, an image processing unit 120, a plurality of microphones 130, an audio processing unit 140, an image output unit 150, a display 160, a manipulation unit 165, a multiplexer 170, a storage unit 180, and a control unit 190.

The plurality of image pickup units 110 outputs an incident light as an image signal. Specifically, each of the image pickup units 110 comprises a lens, a pixel, and an AD converter. The lens collects a light of a subject and forms an optical image on an image pickup area. The pixel outputs a light entering through the lens as an image signal in an analog form. The AD converter converts the image signal in an analog form into an image signal in a digital form and outputs the converted image signal. Hereinafter, it will be assumed that the plurality of image pickup units 110 of the present general inventive concept are embodied as a first image pickup unit 111 and a second image pickup unit 112 for convenience of explanation.

The image processing unit 120 performs signal-processing on an image signal input from the image pickup unit 110 and transmits the processed image signal to the image output unit 150 to display the photographed image.

In addition, the image processing unit 120 may synthesize a plurality of images. Specifically, if a voice of a photographer is sensed from the audio processing unit 140, or a user command is input through the manipulation unit 165, the image processing unit 120 may synthesize an image signal input from a plurality of image pickup units. For example, an image photographed from the second image pickup unit 112 may be synthesized on an image photographed from the first image pickup unit 111 in a Picture-In-Picture (PIP) form.

Figure 4:
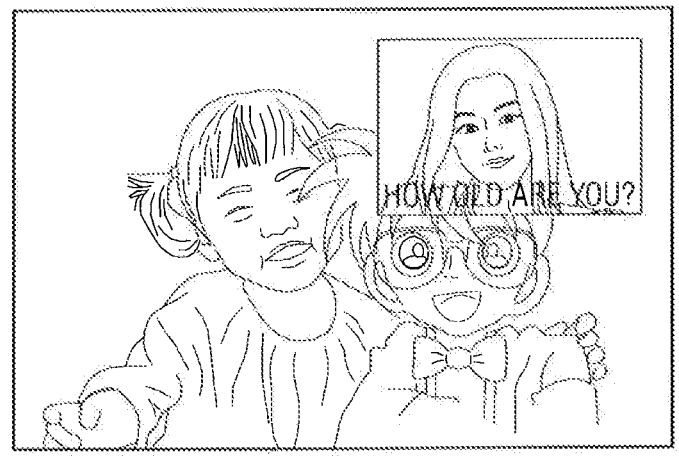
FIGS. 4 and 5 are views to explain an operation of converting audio input from a microphone into a text and adding the converted text to an image in a form of a subtitle.

In addition, the image processing unit 120 may add a text to an image. Specifically, the image processing unit 120 may add a text generated from the audio processing unit 140 to an image. For example, if a text corresponding to audio of a photographer is detected from the audio processing unit 140, the image processing unit 120 may add the text of the photographer to an image area photographed from the second image pickup unit 112. Meanwhile, FIG. 4 illustrates only an example in which a text corresponding to a photographer is added, however, if a text corresponding to the voice of a person to be photographed is detected from the audio processing unit 140, the text of the person to be photographed may be added to an image area photographed from the second image pickup unit 111.

Figure 5:
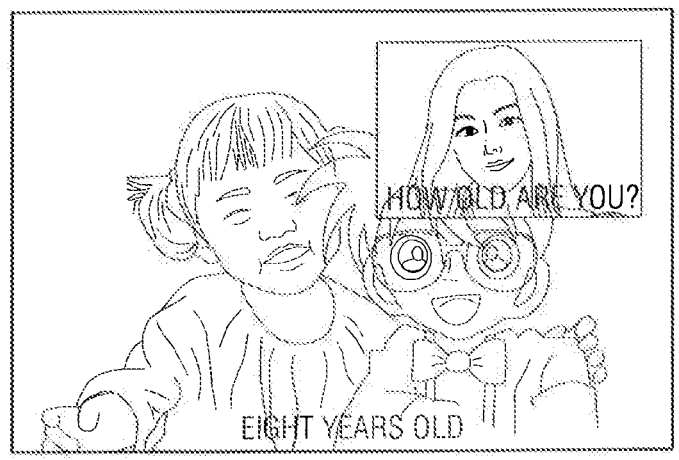

Meanwhile, if a plurality of texts having a different subjects from each other is generated from the audio processing unit 140, the image processing unit 120 may add a corresponding text to an image area corresponding to each text. For example, as illustrated in FIG. 5, the image processing unit 120 may add a text of a person to be photographed to an image area photographed from the first image pickup unit 111 and a text of a photographer to an image area photographed from the second image pickup unit 112. Meanwhile, in the above exemplary embodiment with respect to FIG. 1, a text is added after a plurality of images is synthesized, however, a text may be added to each image and then, the image with text may be synthesized.

In addition, the image processing unit 120 outputs an image by processing an image signal using a codec to store a photographed image. Specifically, the image processing unit 120 may compress an image-processed image signal using a video codec suitable for a system such as MPEG 4 and H.264.

The plurality of microphones 130 outputs received sound as an audio signal. Specifically, each of the microphones 130 may be embodied as a stereo microphone and may have different directivity from each other microphone. Hereinafter, it will be assumed that the plurality of microphones 130 is embodied as a first microphone 131 and a second microphone 132 for convenience of explanation.

The audio processing unit 140 performs signal-processing on an audio signal input from each of the plurality of microphones 130 and transmits the plurality of signal-processed audio signals to the multiplexer 180. Specifically, the audio processing unit 140 may compare an audio signal input from a specific microphone with an audio signal input from a different microphone and remove noise and the detected voice included in the audio signal input from the specific microphone. For example, the audio processing unit 140 may compare an audio signal input through the first microphone 131 and an audio signal input through the second microphone 132, detect noise, and remove noise detected in the audio signal input through the first microphone 131. In addition, the voice of a photographer detected in the following operation may also be removed from the audio signal input through the first microphone 131.

The audio processing unit 140 senses a voice of a photographer. Specifically, the image pickup device 100 according to an exemplary embodiment comprises a plurality of microphones 130 which are spaced apart from each other, and thus, the different microphones may sense sound at different times. Accordingly, a microphone facing a photographer senses sound first and, if the sound is a voice, the audio processing unit 140 may identify the sound as the voice of the photographer.

In addition, the audio processing unit 140 converts the sensed voice into a text. Specifically, the audio processing unit 140 may convert the sensed voice into a text using a voice recognition method. In this case, the audio processing unit 140 may distinguish the converted text according to a location of a microphone. If the first microphone 131 senses the voice first, the audio processing unit 140 may convert the sensed voice into a text of a person being photographed, and if the second microphone 132 senses the voice first, the audio processing unit 140 may convert the sensed voice into a text of a photographer.

In other words, based on whether the voice is received first by the first microphone 131 or the second microphone 132, the audio processing unit 140 and the image processing unit 120 may perform different functions. For example, the audio processing unit 140 may convert the detected voice to text only if it is determined that the detected voice originates from a predetermined one of the first microphone 131 and the second microphone 132. Alternatively, the audio processing unit 140 may perform a voice cancellation operation only if it is determined that the voice originates from the second microphone 132.

The audio processing unit 140 outputs a processed audio signal using a codec to store the voice. Specifically, the audio processing unit 140 may compress an audio signal in which noise is removed using an audio codec suitable for a system such as AAC, AC3, and MP3.

The image output unit 150 outputs an image signal received from the image processing unit 120 to the internal display or an external output terminal.

The display 160 displays a photographed image on a screen.

The manipulation unit 165 receives a command through user manipulation. The manipulation unit 165 may be provided on the surface of the image pickup device 100 in the form of a button or on the display 160 in the form of a touch screen. In addition, the manipulation unit 165 receives a command to change the form of synthesis from an image processing unit. Herein, the command to change the form of synthesis is a command to change the operation of a plurality of image pickup units and the layout of synthesis. For example, images may be photographed using only the first image pick up unit, using only a second image pickup unit, or using both the first image pickup unit and the second image pickup unit but with an image photographed from the first image pickup unit as a main image or with an image photographed from the second image pickup unit as a main image.

The multiplexer 170 (MUX) combines an image with voice. Specifically, the multiplexer 170 may generate a video file by combining an image input through the image processing unit 120 with a voice input through the audio processing unit 140 and including additional data.

More specifically, if a user performs photographing using only the first image pickup unit 111, the multiplexer 170 may combine an output image of the image processing unit 120 (an image signal of the first image pickup unit 111) with an audio signal of the first microphone 131 from among output audio of the audio processing unit 140.

If a user performs photographing using only the second image pickup unit 112, the multiplexer 170 may combine an output image of the image processing unit 120 (an image signal of the second image pickup unit 112) with an audio signal of the second microphone 132 from among output audio of the audio processing unit 140.

If a user performs photographing using both the first pickup unit 111 and the second image pickup unit 112, the multiplexer 170 may determine which image of the image pickup unit is a main image and combine an audio signal corresponding to the main image with an output image of the image processing unit 120. For example, if an image of the first image pickup unit 111 is a main image, the multiplexer 170 may combine an output image of the image processing unit 120 (a PIP image) with an audio signal of the first microphone 131 from among output audio of the audio processing unit 140.

If an image of the second image pickup unit 112 is a main image, the multiplexer may combine an output image of the image processing unit 120 (a PIP image) with an audio signal of the second microphone 132 from among output audio of the audio processing unit 140. Meanwhile, such an audio signal may be selected in the audio processing unit 140 in advance.

The multiplexer 170 may combine an output image of the image processing unit 120 with a plurality of audio signals. Specifically, a plurality of audio signals may be combined as a different channel and thus, if a user performs photographing using both the first image pickup unit 111 and the second image pickup unit 112, the multiplexer 170 may combine an output image of the image processing unit 120 with a plurality of output audio of the audio processing unit 140.

The storage unit 180 stores a combined image and voice. Specifically, the storage unit 180 may store a video file generated by the multiplexer 170. Meanwhile, the storage unit 180 may be embodied using a flash memory, a hard disk, a DVD, and so on.

The control unit 190 controls each component of the image pickup device 100. Specifically, if a voice of a photographer is sensed from the audio processing unit 140, the control unit 190 may control the image pickup unit corresponding to the location of the photographer, and may control the image processing unit 120 so that an image photographed from the image pickup unit may be combined with an image photographed from the image pickup unit 111 which has been operated previously.

As described above, the image pickup device 100 according to an exemplary embodiment may detect the voice of a photographer using a plurality of microphones and may photograph or record a photographer using an image pickup unit corresponding to the photographer once voice of the photographer is sensed. Therefore, a plurality of image pickup units may be controlled easily. In addition, since respective microphones 132 and 132 are used to provide audio for respective images, a sound source may be recorded more vividly than when only one microphone is used, for example.

Figure 2A:
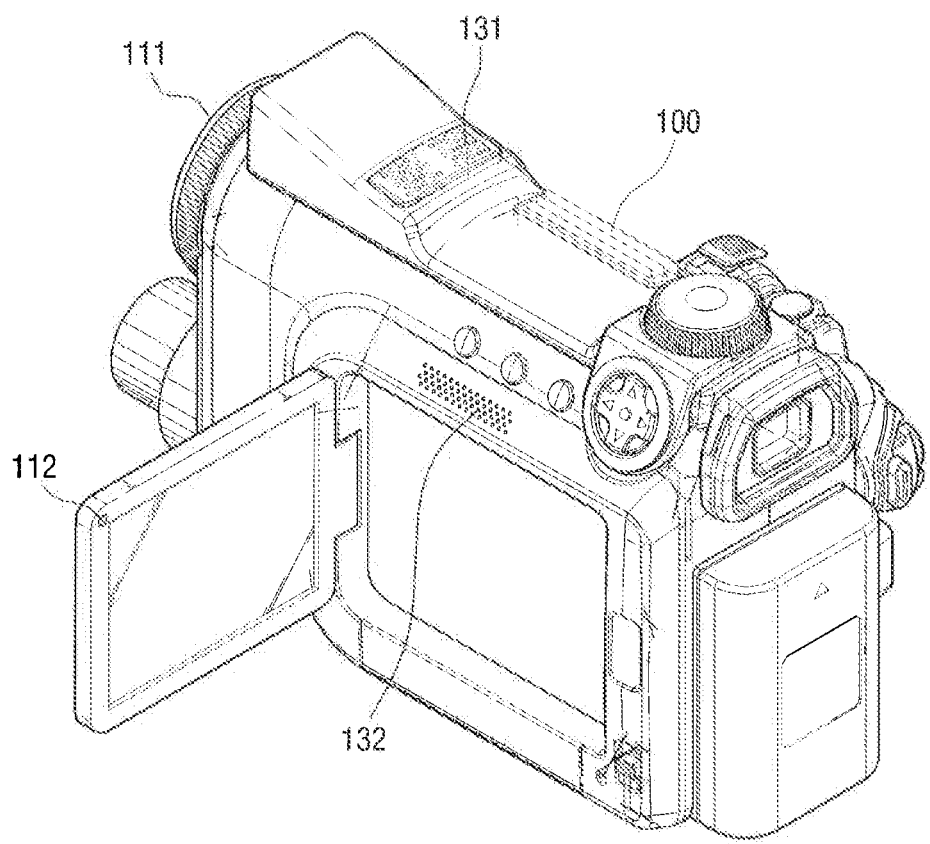
FIGS. 2A and 2B are views to explain a shape of an image pickup device 100 according to exemplary embodiments of the present general inventive concept.

FIG. 2A is a view to explain a shape of the image pickup device 100 according to an exemplary embodiment.

Referring to FIG. 2A, the image pickup device, or image capture device, 100 according to an exemplary embodiment includes a plurality of image pickup units 111 and 112.

Specifically, the image pickup unit 111 is disposed in a front direction of the image pickup device 100 and picks up an image in front of the image pickup device 100. A person or a subject to be photographed may be photographed through the first image pickup unit 111.

The second image pickup unit 112 faces a rear direction of the image pickup device 100 and picks up an image at the rear of the image pickup device 100. In particular, the photographer or operator operating the image pickup device 100 may be photographed through the second image pickup unit 112.

The image pickup device 100 according to an exemplary embodiment includes a plurality of microphones 131 and 132. Specifically, the first microphone 131 and the second microphone 132 are spaced apart from each other as illustrated in the FIG. 2. Since the microphones 131 and 132 are spaced apart from each other, the location of a sound source may be identified considering the difference of time in detecting sound between the two microphones. For example, if a photographer in the rear direction of the image pickup device 100 talks, the second microphone 132 senses the sound first since it is located near the photographer. Accordingly, if sound is sensed through the second microphone 132 first, it can be determined that the sound is the voice of the photographer.

Figure 2B:
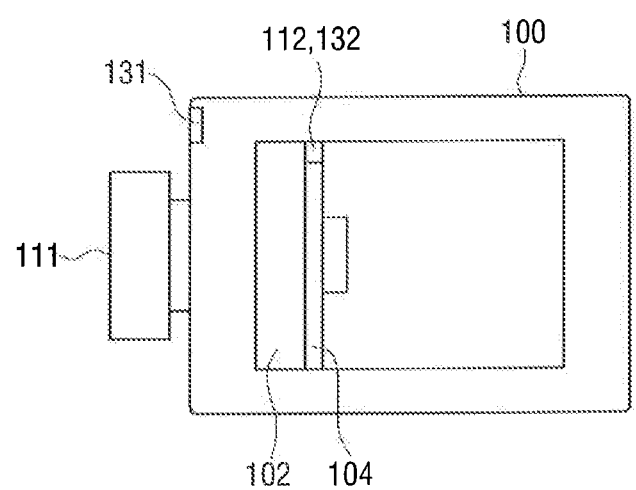

FIG. 2A illustrates an example in which the first microphone 131 faces upward and the second microphone 132 faces to the side. The second microphone 132 is closer to the rear of the image pickup device 100 to detect a voice from the rear before the first microphone 131. However, the microphones may be arranged to have any desired configuration. FIG. 2B illustrates an example in which the first microphone 131 faces a front of the image pickup device 100 and the second microphone 132 is located on a fold-out frame 102 to house a screen 104, and the second microphone 132 faces to the rear of the image pickup device 100.

Meanwhile, in the above description regarding FIGS. 1, 2A, and 2B, two image pickup units are used, but this is only an example. The image pickup device 100 may include more than two image pickup units. In addition, the first pickup unit 111 photographs a person or a subject to be photographed and the second image pickup unit 112 photographs a photographer in the above description, but the operations may be performed in a reversed way.

FIGS. 3A to 3D illustrate an operation of an image processing unit and a multiplexer in FIG. 1.

Figure 3A:
FIGS. 3A to 3D illustrate an operation of an image processing unit and a multiplexer in FIG. 1.

Referring to FIG. 3A, if a user photographs an image using only a main lens (the first image pickup unit 111), the image processing unit 120 may process only an image photographed by the first image pickup unit 111, and the multiplexer 170 may combine an output image of the image processing unit 120 (an image signal of the first image pickup unit 111) with an audio signal of the first microphone 131 from among output audio of the audio processing unit 140.

Figure 3B:
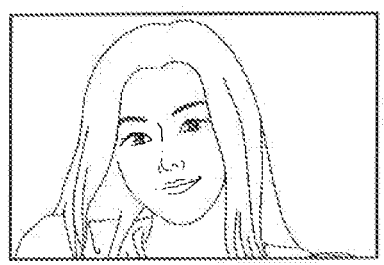

Referring to FIG. 3B, if a user a user photographs an image using only a sub lens (for example, the second image pickup unit 112), the image processing unit 120 may process only an image photographed by the second image pickup unit 112, and the multiplexer 170 may combine an output image of the image processing unit 120 (an image signal of the second image pickup unit 112) with an audio signal of the second microphone 132 from among output audio of the audio processing unit 140.

Figure 3C:
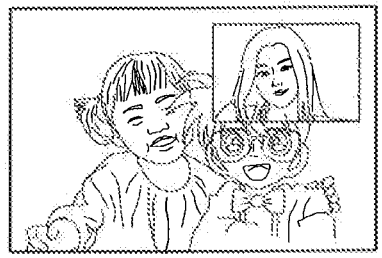

Referring to FIG. 3C, if a user photographs a PIP image in which an image photographed from the main lens (the first image pickup unit 111) is a main image, the image processing unit 120 may combine an image photographed from the second image pickup unit 112 on an image photographed from the first image pickup unit 111 in the form of a PIP image, and the multiplexer 170 may combine an output image (a PIP image) of the image processing unit 120 with an audio signal of the first microphone 131 from among output audio of the audio processing unit 140.

Figure 3D:
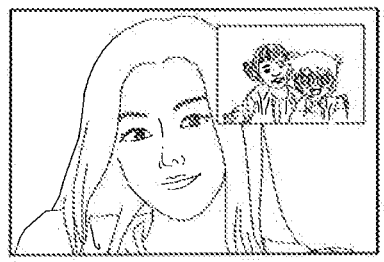

Referring to FIG. 3D, if a user photographs a PIP image in which an image photographed from the sub lens (the second image pickup unit 112) is a main image, the image processing unit 120 may combine an image photographed from the first image pickup unit 111 on an image photographed from the second image pickup unit 112 in the form of a PIP image, and the multiplexer 170 may combine an output image (a PIP image) of the image processing unit 120 with an audio signal of the second microphone 132 from among output audio of the audio processing unit 140.

FIGS. 4 and 5 are views to explain an operation of converting audio input from a microphone into a text and adding the converted text to an image in a form of a subtitle.

Referring to FIG. 4, the image processing unit 120 according to an exemplary embodiment may add a text generated from the audio processing unit 140 to an image. Specifically, the voice of a photographer is detected from the second microphone 132 and a text is generated from the detected voice. Subsequently, the image processing unit 120 may confirm that the text is added to an image area photographed from the second image pickup unit 112 corresponding to the second microphone 132.

Referring to FIG. 5, it can be seen that a text corresponding to the voice of a person to be photographed is added to an image area photographed from the first image pickup unit 111, and a text corresponding to a photographer is added to an image area photographed from the second image pickup unit 112.

Figure 6:
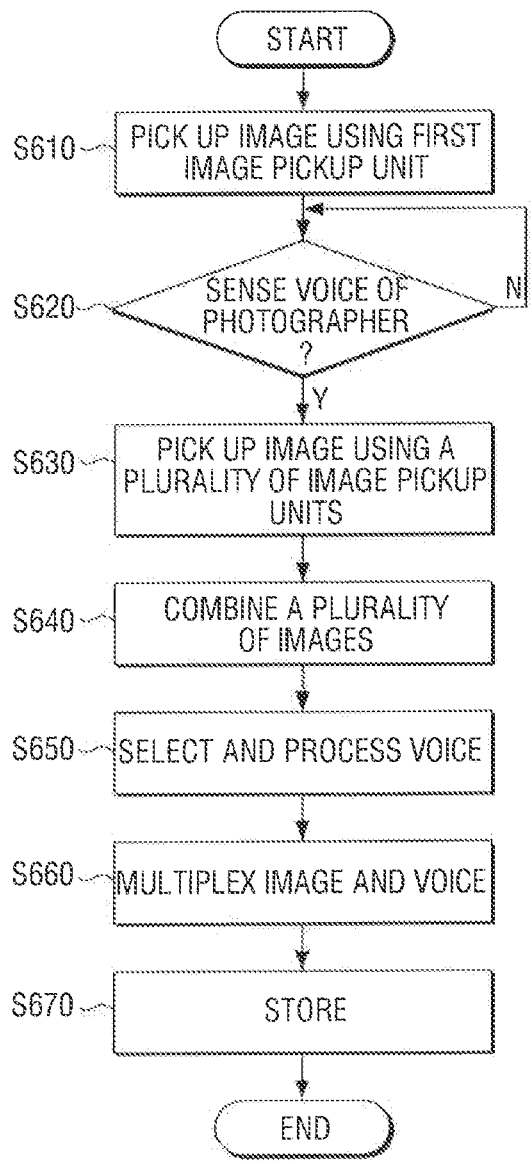
FIG. 6 is a flowchart to explain a method of picking up an image according to an exemplary embodiment.

FIG. 6 is a flowchart to explain a method for picking up an image according to an exemplary embodiment.

Referring to FIG. 6, first of all, photographing is performed using one of image pickup unit from among a plurality of image pickup units (S610).

Subsequently, the voice of a photographer is sensed (S620). Specifically, it can be confirmed that the voice of a photographer is sensed if the voice is sensed from a microphone facing the backside of the image pickup device where a photographer usually located using a plurality of microphones 130 which are spaced from each other.

Afterwards, photographing is performed using a plurality of image pickup units (S630). Specifically, photographing may be performed using a plurality of image pickup units as an image pickup unit corresponding to a photographer is operated.

A plurality of photographed images are combined (S640). Specifically, an image from an image pickup unit corresponding to the location of a photographer may be combined with an image from an image pickup unit which is currently performing photographing. For example, an image photographed from the second image pickup unit 112 may be combined on an image photographed from the first image pickup unit 111 in the form of a PIP image, and signal-processing and encoding may be performed with respect to the combined image.

If a microphone corresponding to a photographed image is selected from among a plurality of microphones, audio-processing is performed with respect to the audio from the selected microphone (S650). Specifically, an audio signal input from a specific microphone (which corresponds to a photographed image) is compared with an audio signal input from another microphone, and audio-processing such as removing noise included in the audio signal input from the specific microphone may be performed.

Subsequently, audio from one of a plurality of microphones is combined with a synthesized image (S660). Since the operation of combining an audio signal with an image signal has been explained above with regard to the configuration of the multiplexer 170, further explanation will not be provided.

Afterwards, the combined audio and video is stored (S670).

As such, according to an image pickup method of the present invention, the voice of a photographer may be detected using a plurality of microphones, and photographing may be performed using a plurality of image pickup units once the voce of a photographer is sensed, making it possible to control the plurality of image pickup units easily. In addition, as the voice of a microphone corresponding to an image is used, a sound source may be recorded more vividly. The image pickup method in FIG. 6 may be performed not only in the image pickup device 100 having the configuration illustrated in FIG. 1 but also on an image forming apparatus having other configuration.

Figure 7:
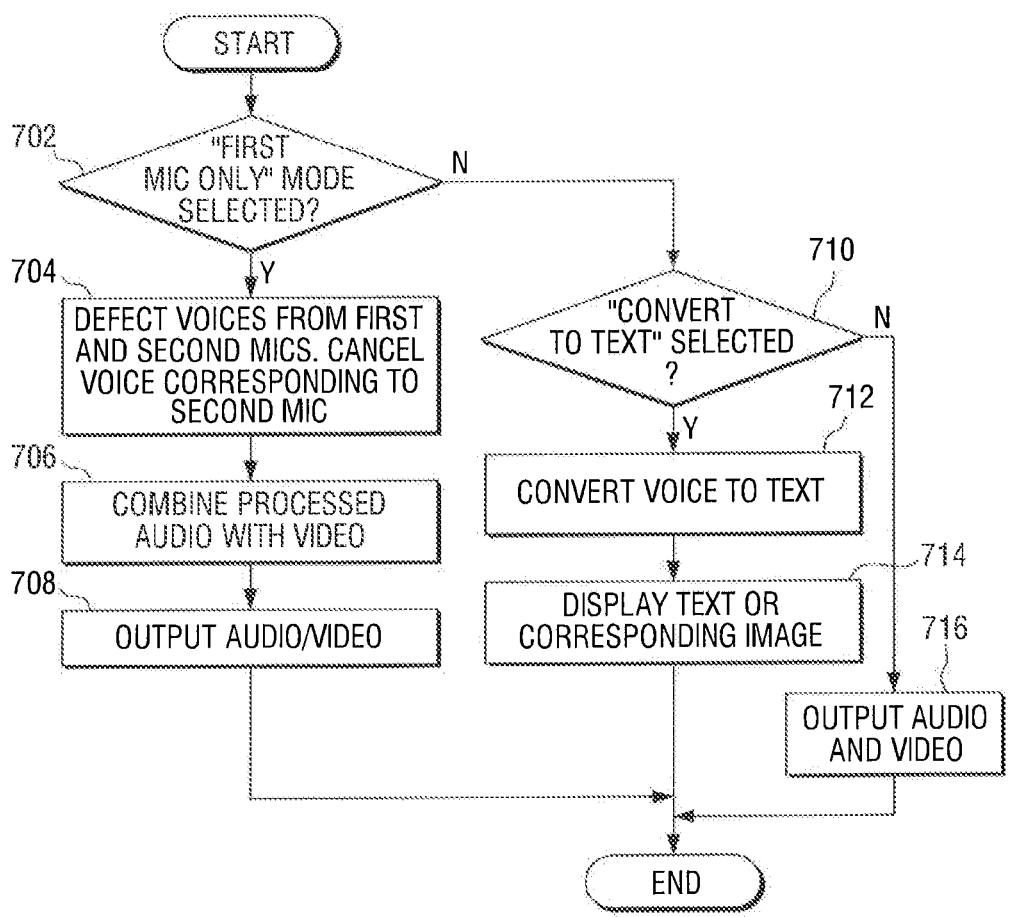
FIG. 7 illustrates a method of combining video and audio according to an embodiment of the general inventive concept.

FIG. 7 illustrates a method of controlling the image pickup apparatus 100 according to an embodiment of the present general inventive concept.

An image pickup apparatus 100 having two microphones may detect whether an input has been received to output a voice corresponding to only one of the microphones (702). Determining whether a voice "corresponds" to a particular microphone, as discussed above, may include detecting which microphone first detects the voice. Thus, a voice of a subject in front of a microphone will be recorded first by that microphone facing the front direction, then by a microphone farther away. In such a case, the voice corresponds to the microphone facing the front direction. Conversely, the voice of a subject located in a rearward direction will first be detected by a rear-facing microphone, and thus the voice corresponds to the rear-facing microphone.

The microphone selected in operation 702 may be either one of a front-facing microphone and a rear-facing microphone, as described above with respect to FIG. 2. However, additional microphones could be utilized.

If it is determined in operation 702 that only one microphone input is selected, a cancellation process may be performed to cancel a voice received from a non-selected microphone (704). In particular, the voices received at both a selected and a non-selected microphone may be input, the voice corresponding to the non-selected microphone may be detected, and the audio signal may be processed to remove or decrease the magnitude of the voice corresponding to the non-selected microphone.

Alternatively, instead of the cancellation process, the non-selected microphone may be turned off.

The processed audio including the voice from the selected microphone may be combined with the captured images, such as video (706) and output to a screen (708) or stored in memory.

If it is determined in operation 702 that both microphones are selected, it may further be determined if a "convert-to-text" operation is selected (710). The "convert-to-text" operation may be selected for one or both of the microphones.

If the "convert-to-text" operation is selected, the voice received via the selected microphone(s) may be converted to text (712), and the text may be combined with the captured video to be displayed on a screen (714) or saved in memory. The voice-to-text operation may include muting the voice corresponding to a selected microphone and replacing the muted voice with text, or it may include combining each of the voice, a corresponding image, and the text to be displayed and output.

If it is determined in operation 710 that a convert-to-text operation is not selected, the received voice and video from each of the microphones and/or image capture units may be output (716) or stored in memory.

It should be noted that the voice-to-text operation may be performed when only one microphone is selected.

Figure 8:
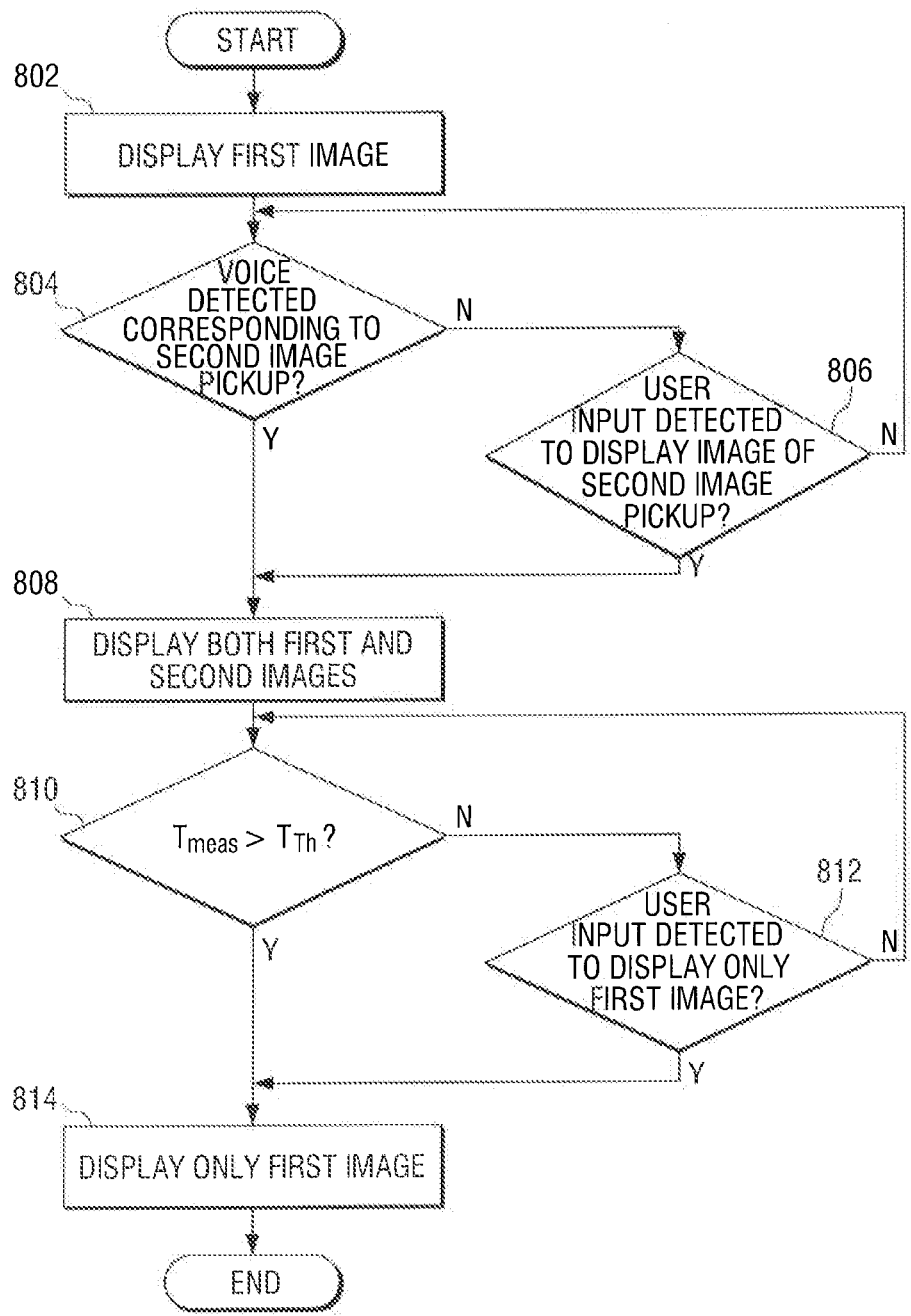
FIG. 8 illustrates a method of sensing a voice and displaying a corresponding image.

FIG. 8 illustrates a method to perform an auto-detect operation of an image pickup device according to an embodiment of the present general inventive concept.

A first image corresponding to an image capture unit facing a first direction may be captured and displayed (802). Audio may also be captured, corresponding to a microphone facing in the first direction. In operation 804, it may be determined whether a voice is detected corresponding to a microphone facing in a second direction different from the first direction. For example, the microphone facing the second direction may be facing in a rearward direction of an image pickup device to correspond to a position of a photographer or user of the image pickup device.

If no voice is detected in operation 804, it may further be determined whether a user input has been received to display an image corresponding to an image capture unit facing the second direction (806). If neither a voice is detected nor a user input has been received, the image pickup device may continue to display only the first image.

However, if it is determined in operation 804 that a voice corresponding to the second microphone (i.e. the microphone facing the second direction) is detected (804), or if a user input is detected (806), then images corresponding to both the first image capture unit and a second image capture unit facing in the second direction may be displayed (808), where the first and second image capture units correspond to the image capture units facing in the first and second directions, respectively. The image corresponding to the second image capture unit may be designated as a sub-picture, and may be displayed as a picture-in-picture (PIP) within the displayed image corresponding to the first image capture device.

Thus, the image pickup device may automatically display a person speaking, for example a photographer, when the image pickup device detects the voice of the person speaking.

Once the voice is detected in operation 804 or a user input is received (806), the image corresponding to the second image capture unit ("second image") may remain displayed and/or recorded until the end of the display and/or recording operation. Alternatively, a timer may begin and the image pickup device may determine whether a time that has passed Tmeas is equal to or greater than a predetermined threshold time Tth. When the measured time Tmeas is greater than or equal to the threshold time Tth, the image pickup unit may automatically turn off the display of the second image, so that only the image corresponding to the first image pickup device ("first image") is displayed (814).

In addition, if it is determined in operation 810 that the measured time Tmeas is not equal to or greater than the threshold time Tth, it may be determined in operation 812 whether a user input has been received to display on the first image. If the user input has been received, the image pickup device may turn off the display of the second image and may display only the first image (814).

Since a predetermined period of time Tth passes before the second image is turned off, repeated turning on and off of the second image, which can distract a viewer, can be avoided.

Figure 9:
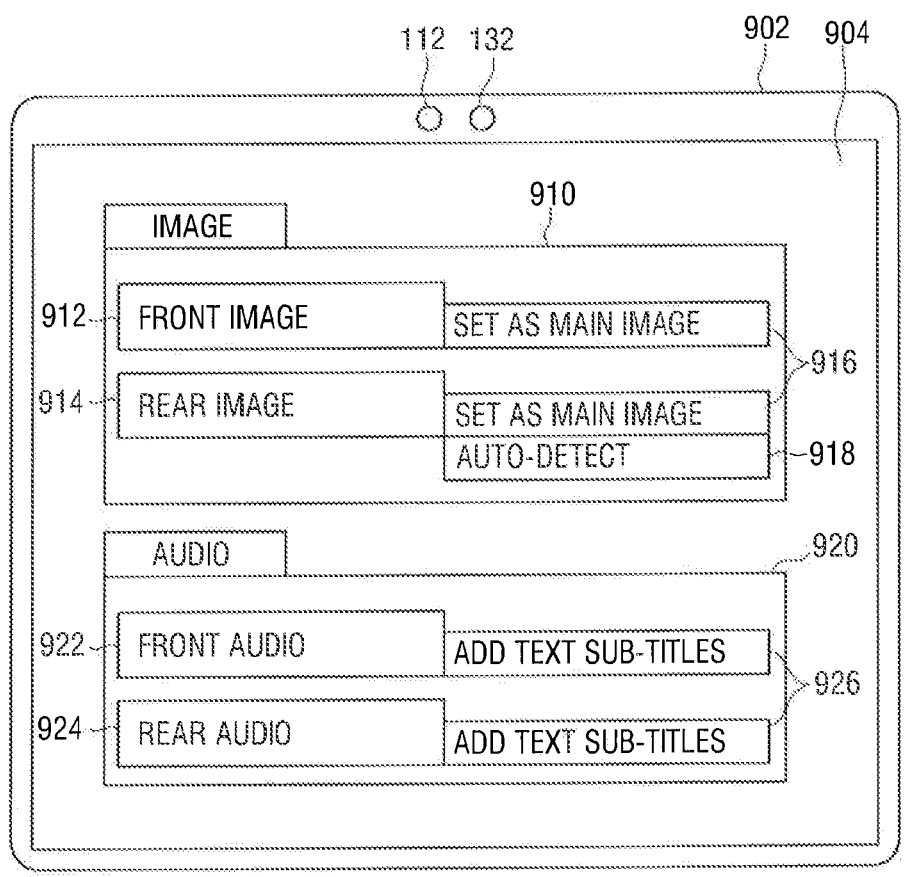
FIG. 9 illustrates an option display according to the present general inventive concept.

FIG. 9 illustrates an example of a user input screen according to an embodiment of the present general inventive concept.

An image pickup device may include a screen frame 902 to house a screen 904. The frame 902 may also house one or more of an image pickup unit 112 and a microphone 132. The screen 904 may provide a user with various options to control recording and/or display of audio and visual data, and a conversion of voice to text.

The screen 904 may display an image portion or menu 910 including buttons 912 and 914 to allow a user to select whether only a front image is recorded/displayed, only a rear image is recorded/displayed, or whether each of a front and rear image is recorded/displayed. The term "recorded/displayed" means either recorded or displayed, or both recorded and displayed.

The image menu 910 may include selection buttons 916 to designate either the front image or the rear image as the main image. In such a case, when both the images are displayed in a PIP mode, the main image is displayed to fill the screen and the sub-image is displayed within only a portion of the main image.

The image menu 910 may also include a button 918 to perform an auto-detect function, as described above with respect to FIG. 8. According to the auto-detect function, an image of the sub-image is displayed when a voice is detected corresponding to a microphone facing the subject of the sub-image. Although not illustrated in FIG. 9, predetermined threshold levels may be set at which the auto-detect function is triggered. For example, the auto-detect function may be controlled to only display the sub-image when a voice having a predetermined magnitude of decibels dB is detected.

The screen 904 may also display an audio portion or menu 920. In the audio menu 920, a user may select buttons 922 and 924 to indicate which microphone audio will be included in the recorded/stored data. According to one embodiment, if a user selects the "front image" button 912 in the image menu 910, then the "front audio" button 922 may automatically be selected. The audio menu 920 may further include buttons 926 to indicate whether to generate text sub-titles to correspond to a detected voice of one of the front audio and the rear audio.

Accordingly, a user may easily and conveniently select from among recording/display functions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image pickup device, comprising:
a plurality of image pickup units;
an image processing unit which processes an image input through the plurality of image pickup units;
a plurality of microphones which are spaced apart from each other;
an audio processing unit which senses a voice of a photographer using the plurality of microphones; and
a control unit which, if the voice of the photographer is sensed through the audio processing unit, controls a second image pickup unit among the plurality of image pickup units to operate and controls the image processing unit to combine an image of the second image pickup unit with an image of a first image pickup unit currently performing photographing.

2. The device as claimed in claim 1, wherein the audio processing unit senses the voice of the photographer using a phase difference of the voice sensed through the plurality of microphones.

3. The device as claimed in claim 1, wherein the audio processing unit compares the voice input from a microphone corresponding to the first image pickup unit currently performing photographing with the voice input from another microphone, and removes noise from the voice input from a microphone corresponding to the first image pickup unit currently performing photographing.

4. The device as claimed in claim 1, wherein the audio processing unit converts the voice input from the plurality of microphones into a text,
wherein the image processing unit adds the converted text to the combined image as a subtitle.

5. The device as claimed in claim 1, wherein the image processing unit combines an image of the second image pickup unit with an image of the first image pickup unit currently performing photographing in a form of a Picture-In-Picture (PIP) image.

6. The device as claimed in claim 1, further comprising:
a multiplexer which combines an image synthesized in the image processing unit with the voice input from at least one microphone from among the plurality of microphones; and
a storage unit which stores the combined image and voice.

7. The device as claimed in claim 1,
wherein the plurality of microphones includes a first microphone corresponding to the first image pickup unit and a second microphone corresponding to the second image pickup unit,
wherein the audio processing unit determines that the voice of the photographer is sensed if the second microphone senses the voice before the first microphone,
wherein the control unit controls the image processing unit to combine an image photographed through the second image pickup unit with an image photographed through the first image pickup unit.

8. The device as claimed in claim 7, wherein the image processing unit combines an image photographed from the second image pickup unit on an image photographed from the first image pickup unit in a form of a PIP image.

9. The device as claimed in claim 8, further comprising:
a manipulation unit which receives a command to change a form of synthesis in the image processing unit,
wherein the image processing unit changes an order of disposing an image of the first image pickup unit and an image of the second image pickup unit according to the command.

10. The device as claimed in claim 7, further comprising:
a multiplexer which, if an image photographed from the first image pickup unit is a main image, combines the voice from the first microphone with an image synthesized in the image processing unit, and if an image photographed from the second image pickup unit is a main image, combines the voice from the second microphone with an image synthesized in the image processing unit; and
a storage unit which stores the combined image and voice.

11. An image pickup method of an image pickup device including a plurality of image pickup units, the method comprising:
performing photographing using at least one image pickup unit from among the plurality of image pickup units;
sensing a voice of a photographer through a plurality of microphones which are disposed spaced apart; and when the voice of the photographer is sensed, operating a second image pickup unit among the plurality of image pickup units and combining an image of the second image pickup unit with an image of a first image pickup unit currently performing photographing.

12. The method as claimed in claim 11, wherein the sensing the voice of the photographer comprises sensing the voice of the photographer using a phase difference of the voice sensed through the plurality of microphones.

13. The method as claimed in claim 11, further comprising:
comparing the voice input from a microphone corresponding to the first image pickup unit currently performing photographing with the voice input from another microphone, and removing noise from the voice input from a microphone corresponding to the first image pickup unit currently performing photographing.

14. The method as claimed in claim 11, further comprising:
converting the voice input from the plurality of microphones into a text; and
adding the converted text to the combined image as a subtitle.

15. The method as claimed in claim 11, wherein the combining comprises combining an image of the second image pickup unit with an image of the first image pickup unit currently performing photographing in a form of a PIP image.

16. The method as claimed in claim 11, further comprising:
combining an image synthesized in the image processing unit with voice input from at least one microphone from among the plurality of microphones; and
storing the combined image and voice.

17. The method as claimed in claim 11,
wherein the plurality of microphones includes a first microphone corresponding to the first image pickup unit and a second microphone corresponding to the second image pickup unit,
wherein the sensing comprises determining that the voice of the photographer is sensed if the second microphone senses the voice before the first microphone,
wherein the combining comprises combining an image photographed through the second image pickup unit with an image photographed through the first image pickup unit.

18. The method as claimed in claim 17, wherein the combining comprises combining an image photographed from the second image pickup unit on an image photographed from the first image pickup unit in a form of a PIP image.

19. The method as claimed in claim 18, further comprising:
receiving a command to change a form of synthesis,
wherein the combining comprises changing an order of disposing an image of the first image pickup unit and an image of the second image pickup unit according to the command.

20. The method as claimed in claim 17 further comprising:
if an image photographed from the first image pickup unit is a main image, combining the voice from the first microphone with an image synthesized in the image processing unit, and if an image photographed from the second image pickup unit is a main image, combining the voice from the second microphone with an image synthesized in the image processing unit; and storing the combined image and voice.

* * * * *